US008417502B1

(12) United States Patent
Anati et al.

(10) Patent No.: US 8,417,502 B1
(45) Date of Patent: Apr. 9, 2013

(54) MIXER HARMONICS CALCULATOR

(75) Inventors: Eitan Anati, Timrat (IL); Eric Hillel, Kiryat Haim (IL); Israel Shachal, Haifa (IL)

(73) Assignee: Scientific Components Corporation, Brooklyn, NY (US)

( * ) Notice: Subject to any disclaimer, the term of this patent is extended or adjusted under 35 U.S.C. 154(b) by 489 days.

(21) Appl. No.: 12/802,683

(22) Filed: Jun. 11, 2010

Related U.S. Application Data

(63) Continuation-in-part of application No. 11/648,238, filed on Dec. 28, 2006, now Pat. No. 7,739,260, and a continuation-in-part of application No. 11/731,244, filed on Mar. 29, 2007, now Pat. No. 7,761,442.

(51) Int. Cl.
  *G06F 17/50* (2006.01)
(52) U.S. Cl.
  USPC ............................................. 703/13; 713/501
(58) Field of Classification Search ............. 703/13, 703/14; 713/501; 330/149; 73/603; 342/146; 29/840
  See application file for complete search history.

(56) References Cited

U.S. PATENT DOCUMENTS

| | | | |
|---|---|---|---|
| 5,257,355 A | 10/1993 | Akamatsu | |
| 5,278,980 A | 1/1994 | Pedersen et al. | |
| 5,493,775 A * | 2/1996 | Darekar et al. | 29/840 |
| 5,942,956 A | 8/1999 | Haq | |
| 5,978,788 A | 11/1999 | Castelli et al. | |
| 6,016,487 A | 1/2000 | Rioux et al. | |
| 6,282,549 B1 | 8/2001 | Hoffert et al. | |
| 6,334,115 B1 | 12/2001 | Kuribayashi | |
| 6,366,904 B1 | 4/2002 | Benhadda et al. | |
| 6,374,260 B1 | 4/2002 | Hoffert et al. | |
| 6,401,006 B1 | 6/2002 | Mizuno | |
| 6,484,169 B1 | 11/2002 | Wilsford | |
| 6,615,166 B1 | 9/2003 | Guheen | |
| 6,704,024 B2 | 3/2004 | Robotham | |
| 6,745,181 B1 | 6/2004 | Chang et al. | |
| 6,769,009 B1 | 7/2004 | Reisman | |
| 6,983,236 B1 | 1/2006 | Karlovac | |
| 6,983,298 B2 | 1/2006 | Thakur | |
| 7,010,472 B1 | 3/2006 | Vasey-Glandon | |
| 7,016,811 B2 | 3/2006 | Peck | |
| 7,039,897 B2 | 5/2006 | Anderson | |

(Continued)

FOREIGN PATENT DOCUMENTS

| | | | |
|---|---|---|---|
| JP | 0911715 A | * | 5/1997 |
| JP | 2002049654 A | * | 2/2002 |

OTHER PUBLICATIONS

Pirich et al., "Electromagnetic environmental efects modeling simulation and test validation for Cosite mitigation—an overview", IEEE 2008.*

(Continued)

*Primary Examiner* — Kandasamy Thangavelu

(74) *Attorney, Agent, or Firm* — Siegmar Silber, Esq

(57) ABSTRACT

A mixer harmonics calculator system is described. The system is designed to perform rapid online calculation of mixer harmonics up to 10×10 RF and LO order using actual measured parametric data optionally supplemented with interpolated or otherwise calculated data. Output options from the mixer harmonics calculator include a comprehensive range of presentations of tabular and graphed data. The mixer harmonics calculator is designed to function either independently or within a more comprehensive electronic component database search system.

24 Claims, 7 Drawing Sheets
(1 of 7 Drawing Sheet(s) Filed in Color)

U.S. PATENT DOCUMENTS

| | | |
|---|---|---|
| 7,061,500 B1 | 6/2006 | Baldwin |
| 7,065,625 B2 | 6/2006 | Alderson |
| 7,069,095 B2 | 6/2006 | Nelson |
| 7,242,406 B2 | 7/2007 | Robotham |
| 7,599,916 B2 | 10/2009 | Weare |
| 7,627,622 B2 | 12/2009 | Conrad |
| 7,864,107 B1 * | 1/2011 | Lehtola .......... 342/146 |
| 7,882,100 B2 | 2/2011 | Andrei |
| 2003/0018633 A1 | 1/2003 | Horn |
| 2004/0249809 A1 | 12/2004 | Ramani et al. |
| 2005/0246403 A1 | 11/2005 | Lee |
| 2006/0036422 A1 | 2/2006 | Gryba |
| 2006/0200455 A1 | 9/2006 | Wilson |
| 2006/0242137 A1 | 10/2006 | Shah et al. |
| 2009/0037759 A1 * | 2/2009 | Lagnado et al. .......... 713/501 |
| 2009/0114024 A1 * | 5/2009 | Shekhawat et al. .......... 73/603 |
| 2011/0115559 A1 * | 5/2011 | Amrutur et al. .......... 330/149 |

OTHER PUBLICATIONS

Grochowski et al., "Integrated circuit testing for quality assurance in manufacturing: history, current status and future trends", IEEE 1997.*

Koch, C., "Measuring the photodetector frequency response for ultrasonic applications by a heterodyne system with difference frequency servo control", IEEE, May 2010.*

Mini-Circuits, Yoni, The Design Engineers Search Engine User's Guide, 2001.

Mini-Circuits, Yoni, Various supporting documents.

* cited by examiner

MODEL SEARCH ENGINE
(Searches actual performance data)

Frequency Mixers

Please enter the specification
(minimum data requirement fields are highlighted)

○ Plug-In    ● Surface Mount    ○ Connector    ○ Not Critical

Packaging Style:

RF/LO Frequency (MHz):   Low [ ] - High [ ]

LO Power Level (dBm):   Low [ ] - High [ ]   (Acceptable LO Power Range)

Max. Conversion Loss (dB): [ ]

Min. LO-RF Isolation (dB): [ ] [ ]

Min. LO-IF Isolation (dB): [ ]

LO Frequency (MHz):   Low [ ] - High [ ]

Min. IP3 (dBm): [ ]

Max. RF port VSWR(:1): [ ]

Max. LO port VSWR(:1): [ ]

RF/LO Frequency (MHz):   Low [ ] - High [ ]

Max. IF port VSWR(:1): [ ]

IF Frequency (MHz):   Low [ ] - High [ ]

[Search] [Clear]

Fig. 3

Mixer Harmonics Calculator Program:

Spur amplitude calculation rules based on Mixer Harmonic data tables tested at 2 RF levels.

| # | Spur (dBc) at RF Power Low (X is negative) | Spur (dBc) at RF Power High (Y is negative) | Program Calculation Rules Steps |
|---|---|---|---|
| 1 | X | Y | Step 1: Interpolation between spur amplitude at RF Power Low and High.<br>Step 2: Defines if the interpolated spur is below the Noise Floor(*). If yes, marks it with '<' sign. |
| 2 | X | <Y | Step 1: Since spur at RF Power High is below the Noise Floor and spur at RF Power Low is not, it should be treat as a mistake: the program will also marks the spur at RF Power Low with '<' sign.<br>Step 2: Same cases as in #4. |
| 3 | <X | Y | Case 1: For RF Power input below RF Power Low<br>→ The spur amplitude resulting = Noise Floor(**) - IF Interpolated (dBm)<br>→ Since X is below the Noise Floor, the spur is marked with '<' sign. |
| 4 | <X | <Y | Case 1: For RF Power input below RF Power Low:<br>→ The spur amplitude = Noise Floor(**) - IF Interpolated (dBm)<br>→ Since X and Y are below the Noise Floor, the spur is marked with '<' sign.<br>Case 2: For RF Power input between RF Power Low and RF Power High:<br>→ The spur amplitude resulting is calculated by interpolation (between spur amplitude at RF Power Low and High).<br>→ Since X and Y are below the Noise Floor, the spur is marked with '<' sign. |

Fig. 4a

MIXER HARMONICS CALCULATOR

CROSS-REFERENCES TO RELATED APPLICATIONS

This application is a continuation-in-part of U.S. patent application entitled DATABASE SEARCH SYSTEM USING INTERPOLATED DATA WITH DEFINED RESOLUTION, Ser. No. 11/648,238 filed Dec. 28, 2006 now U.S. Pat. No. 7,739,260 and U.S. patent application entitled DATABASE SEARCH SYSTEM FOR HIGH FREQUENCY ELECTRONIC COMPONENTS, Ser. No. 11/731,244 filed Mar. 29, 2007 now U.S. Pat. No. 7,761,442.

BACKGROUND OF THE INVENTION

1. Field of the Invention

The present invention relates generally to a mixer harmonic calculator for use with database search systems for high frequency electronic components. More specifically, the invention relates to rapid and efficient online parameter-based database search and calculation systems for mixers and mixer harmonics performance utilizing actual measured performance data as well as optional interpolated and otherwise calculated data; wherein the calculation results also provide the user with the option of obtaining output data including tabular and graphed depictions of mixer performance over the range of operating parameters input.

2. Description of the Prior Art

Engineers designing circuits in the radio frequency (RF) and microwave range have to search through published and online data sheets, online databases and assorted formats of catalogs in order to find appropriate components to match to specific applications. Engineers have to search through an enormous amount of data to find the best component for a particular requirement, and even the experienced high-frequency design engineer is challenged to understand how some components can fit into a circuit or system better than others. Mixers are one type of high frequency circuit where the difference between calculations approximated from ideal models and calculations based on actual measured circuit performance can strongly affect eventual circuit performance.

As used herein, radio frequency is taken to mean the high frequency portion of the electromagnetic spectrum, from at least 3 MHz. Microwave is taken to mean frequencies from at least 300 MHz.

In some design circumstances, a high frequency design engineer will choose to select a component with broader-than-needed general performance characteristics in order to gain improved performance in one or more parameters over a narrower frequency range. For example, rather than simply selecting a double-balanced mixer with RF and intermediate frequency (IF) ranges to translate a desired signal band, the engineer may use broader-band mixers over narrower portions of their range to meet a required linearity specification, or conversion-loss level, or optimum local-oscillator (LO) drive level. This illustrates the basic complexity of design choices made in selecting high frequency electronic components. For mixers in particular, there is a further set of challenges in analyzing the effects of higher order harmonics on circuit performance and signal output. The prior art databases are limited to having actual known harmonic frequencies used in calculations with theoretical "ideal" models, rather than with actual measured data. These "ideal" models are very simplistic and don't include real-world performance effects from the balun circuits, internal balancing networks or from package-induced effects.

Component searches are increasingly performed over highly distributed computer networks due to the ready availability of the World Wide Web and high-speed Internet access, coupled with ever-improving software and server technology for powering content-rich websites. Online (web-based) catalogs represent one class of computer databases, with online catalogs containing parametric data being a significant subset of those. A further significant subset of this type of catalog allows the user to enter choices for a variety of component parameters to search for at once, to aid in efficient searching for a particular component to be appropriate for use under specific performance conditions. Some catalog database search systems of this type also allow the user to perform a limited range of performance simulations as well.

The majority of online catalogs are based on a server-side system, where the user's machine is not performing any calculations or storing any data. Generally such a system is providing the catalog database function to a large number of users at once and the database is very large, so it is imperative that the system be designed to provide a sufficient quality of data at a speed that the user will find acceptable.

The Yoni-1 catalog database system is an example of a prior art online catalog search system containing a considerable body of parametric data for a large number of high frequency electronic components. Users are able to access the catalog through standard web browser software and search for specific components with input variables including frequency range and other electrical performance characteristics, as well as package type. The search output lists the components in the catalog that match the user's search request.

While this type of system offers considerable benefit over simple tabular or graphed listings of devices and their relevant parameters, the search process frequently involves numerous iterations of guessing and refining entered data to gain a match with the component parametric data stored in the database. Further, the selection of high-frequency electronic components requires accurate information about the exact performance of the components under specific conditions of signal input and circuit application.

U.S. Pat. No. 6,334,115 entitled COMPONENT ELECTRONIC CATALOG teaches an electronic component database system intended to aid in selecting and identifying components in a context of circuit design for improved placement during pc board assembly, wherein the stored data includes text-based information about the components, images of the components, mechanical package details and other data relevant to the preparation of automated or semi-automated picking and placing of components. This system is optimized for improving the assembly of components onto pc boards, but has no parameter-based search capabilities for the selection of components for basic circuit design.

U.S. Pat. No. 6,484,169 entitled SELECTION AND ORDERING OF LAMP COMPONENTS teaches an online catalog search system that has a prioritization scheme for a number of component attributes, wherein the user enters a numerical ranking for the importance of each attribute in the context of their specific application. Additionally, if no exact match is achieved with the entered parametric data, data ranges and prioritized attributes, the system informs the user of the no match condition and presents the option of viewing the components in the database that are judged to be closest to the user's criteria. This may lead the user astray, especially if there have already been several frustrating search iterations.

There is also no provision for prioritizing the parametric data or data range entries, or for performing any device simulation or analysis.

The Yoni2 database search system offers significant improvements over the prior art, as taught in two patent applications. Patent application Ser. No. 11/648,238 entitled DATABASE SEARCH SYSTEM USING INTERPOLATED DATA WITH DEFINED RESOLUTION teaches a parametric database system capable of interpolating between actual measured data points to further populate the database with interpolated data, capable of limiting data resolution to a desired level to prevent overuse of memory and processing resources, and of redefining the resolution defined by the user to be no greater than the set resolution programmed into the system. Patent application Ser. No. 11/731,244 entitled DATABASE SEARCH SYSTEM FOR HIGH FREQUENCY ELECTRONIC COMPONENTS teaches a high frequency component search system allowing users to perform an online search within a given product category based on their own specifications, but with component-specific guidance about which parameters are generally more important within the context of the database. The Yoni2 system uses highly optimized search algorithms to return search results rapidly, and when the search fails to achieve a data match, offers the option of prioritizing one or more parameters in the process of refining the entered parameters for a next search iteration. While the current Yoni2 database system is more capable than earlier database search systems for locating and specifying high speed electronic components, the selection of mixer components would be greatly improved by the capability to analyze accurate harmonics data for specified LO and RF input frequency ranges.

Software tools to predict and display M×N order LO and RF mixing products are well known in the art. There are also software tools to estimate the amplitude of mixer output signals based on the input signal levels, using mathematical models for the nonlinear elements of the mixer to predict the amplitude of mixing products including the harmonics. Some of these tools for calculating mixer harmonics, also known as mixer spurious products or "spurs", are available online. However, these software tools are based on ideal conditions, not on real-world use of mixers. To achieve isolation, most mixers are designed in a balanced configuration such that the signal ports of the mixer include baluns to drive the internal semiconductor mixing structure. Typically the balun structure is composed of diodes or Field Effect Transistors (FETs). These balun structures at the mixer ports present impedances that vary as a function of frequency and this impedance change affects the amount of harmonic content generated in the mixer as well as how much harmonic energy enters or leaves the mixer ports such that the harmonic termination very far out of the input frequency band will affect the mixing products generated in the frequency band. Thus, the termination presented to the nonlinear semiconductor elements both in and out of the frequency band will affect performance within that frequency band. The baluns, plus any internal matching networks and the high-frequency parasitic effects of electronic packaging all serve to deviate actual circuit performance from ideal models.

Given the inherent tradeoffs between bandwidth, performance, size and cost, there are many mixer configurations available for different frequency ranges, bandwidths and LO levels. Every mixer circuit has a unique set of performance parameters based on the actual circuit, including the type of semiconductor devices used, the balun structures, the matching networks, and the electronic packaging. Unless actual measured data is used to characterize the performance of a given mixer, any performance calculations will be approximate at best.

A more capable mixer harmonics calculator would have means for interpolating between actual measured data points and calculating M×N order harmonics frequencies and amplitude in response to specified bands of LO and RF input signals. Further, the mixer harmonics calculator would enable display of database search and calculation results in tabular and graphed formats allowing optimization of data viewing for selected frequency ranges. A more capable high frequency electronic component database search system would include a mixer harmonics calculator utilizing actual measured data for each mixer component, including measurements of effects from real-world components such as mixer baluns and balancing networks, and the high frequency effects of electronic packaging.

SUMMARY

A more capable mixer harmonics calculator system comprises a database configured for organized storage and retrieval of parametric data from a memory for a plurality of electronic mixer components, a search engine for searching the database memory in response to a user query, a query entry module configured to accept user query input in the form of parameter values and parameter value ranges for parametric data which differs for each electronic mixer component in the database, a calculator module performing harmonics calculations with parametric data found by the search engine, and, an output module configured to provide display of the results of the harmonics calculations. Preferably, the mixer harmonics calculator system can accept input in the form of part numbers for electronic mixer components stored in the database, can accept data input to yield non-model-based calculated harmonics results, and can accept parametric values and ranges in order to search for electronic mixer components matching a user query, and then automatically enter data for the selected mixer component into the calculator.

The parametric data used by this mixer harmonic calculator system is actual measured parametric data as opposed to data derived from component performance simulations. This data is taken for each mixer at a frequency chosen for best linear results, for two power levels and for up to $10^{th}$ order harmonics. Interpolated and otherwise calculated parametric data derived from the actual measured parametric data may be used in selected circumstances to increase the resolution of the data in the database, as additional parametric data to directly populate the database and as parametric data calculated in response to a user query. Optionally, the parametric data input by the user may be a combination of required data input and optional data input. The actual measured parametric data includes measurements taking into account internal balun performance, matching networks performance and electronic package performance effects for each of the plurality of electronic mixer components. In the present invention, data is measured for each mixer at two power levels and a specific frequency for harmonics up to $10^{th}$ order. Preferably, the query entry module and calculator module provide means for selecting and calculating multiple orders of sum/difference mixing products up to at least a 10×10 matrix of mixing products.

The user input module preferably includes selections for mixer model name, mixer detailed information, the option of mixer search, up/down converter selection, RF power level, LO power level, matrix size for orders of mixing products, LO frequency low limit, LO frequency high limit, RF frequency input specification (spec) band low limit, RF frequency input spec band high limit, RF frequency input wider band low limit, RF frequency input wider band high limit, IF frequency output spec band low limit, IF frequency output spec band high limit, IF frequency output wider band low limit and IF frequency output wider band high limit. Additionally there is preferably a button for general information about the software, and a display of input data validation including a count of errors and warnings from missing or erroneous data. The result of the harmonics calculations are preferably displayed in a user-selected choice of a graphic chart or a map and table of harmonics levels.

The map and table option preferably displays M by N (where M=RF and N=LO) matrix maps of harmonics for both [mRF−nLO] and [mRF+nLO], including the 1,1 harmonic order, all harmonic orders within the spec band and all harmonics orders outside of the spec band. Additionally, the map and table option preferably displays the harmonics in tabular form, including the M and N orders, the amplitude level expressed in dBc, the RF range, the LO range, the IF range and whether the harmonic falls within the spec band. The preferred map and table option also states that the harmonics level calculation is based on actual measured data, and lists the frequency and power levels for both RF and LO inputs. Further, there are preferably buttons for switching between the map and table display option and the chart display option, as well as a print button and an exit button.

The graphic chart option preferably displays a chart of all harmonics for a given range of RF and LO inputs, including harmonics within the spec band, all harmonics outside the spec band and all harmonics that will never fall within the spec band. Each group of harmonics may be selectively displayed, where the spec band window is preferably displayed as an outlined box within the chart, harmonics of particular interest may be selected and their associated data highlighted in an included table of harmonics data, and the IF Harmonic Order |1RF−1LO| is particularly highlighted within the chart. Labels bordering the spec band box preferably display the exact Harmonic Order entry and exit frequencies of the desired RF & IF spec band. Preferably the LO frequency may be adjusted by a sliding control and also by increment and decrement buttons with user definable step ranges. Additionally, as a cursor is moved over the chart the RF and IF frequencies are preferably displayed for the location of the cursor. Further, there are preferably buttons for zooming within the chart, panning while zoomed in, zooming out to the defined extents of the chart, taking a snapshot of the displayed screen as a copy to paste into a document, saving the chart display as a digital image file, switching between the map and table display option and the chart display option, as well as a print button and an exit button. The printed output module provides user input parameters (as inserted by the user), measured conditions of the selected mixer, "map and table" or "chart" (user selected) of the harmonics order as well as outputting data in a table format including amplitude, frequency of the harmonics order and an indication whether the specified harmonic order is within the specification band.

The incorporation of the mixer harmonics calculator into an electronic component database search system offers the capability of searching for a specific type of mixer component and then verifying the mixer's harmonics performance over a specified input frequency range. Having the database search system also include components other than mixers serves to further expand the utility and benefit of the system.

OBJECTS AND FEATURES OF THE INVENTION

It is an object of the present invention to provide a mixer harmonic calculator to obtain a calculation of mixer harmonics frequencies and amplitude levels by entering values for a group of specific parameters.

It is another object of the present invention to provide a means for searching a mixer components database for a suitable mixer and to input relevant parameters of the chosen mixer directly into a harmonics calculator.

It is yet another object of the present invention to operate with a database populated with a large volume of actual measured data, as opposed to data generated by simulation algorithms.

It is still another object of the present invention to attempt to match performance limits or a performance window to a user's request.

It is a further object of the present invention to perform user-requested calculations rapidly, typically in a fraction of a second.

It is yet a further object of the present invention to provide the user with the option of obtaining tabular or graphed performance data for the range of parameters input during the component search.

It is a feature of the present invention that additional parametric data may be interpolated or otherwise calculated to supplement the actual measured parametric data, either to directly populate the database or in response to a user query.

It is another feature of the present invention that, in chart mode, when moving the mouse cursor over the chart area, the RF and IF Frequencies will be displayed according to the cursor position on the screen.

It is yet another feature of the present invention that the toolbar utility provides the user the following options:
1. Zoom In: Select the desired rectangular area on the chart by placing the cursor on the chart and dragging over the desired area.
2. Actual Size: Zoom out to the original size.
3. Move Chart: Move the chart (including spec window) in all directions. (Available in zoom mode only.)
4. Copy to clipboard: copy the chart to the clipboard in order to paste the content to another document.
5. Save: Save the chart in picture file. (Available formats: JPG, BMP, GIF.)

It is still another feature of the present invention to provide validation (verification) of the input data and display error/warning messages accordingly.

It is a further feature of the present invention to provide means for altering the LO frequency in order to see a graphical display of the shift in harmonics in and out of a defined spec band window.

BRIEF DESCRIPTION OF THE DRAWINGS

The patent or application file contains at least one drawing executed in color. Copies of this patent or patent publication with color drawing(s) will be provided by the Office upon request and payment of the necessary fee.

FIG. 3 is a representation of the Yoni2 frequency mixer search request screen;

FIG. 4a is a chart showing the spur amplitude calculation rules for use in the mixer harmonics calculator program;

DESCRIPTION OF THE PREFERRED EMBODIMENT AND BEST MODE

Figure 1A:
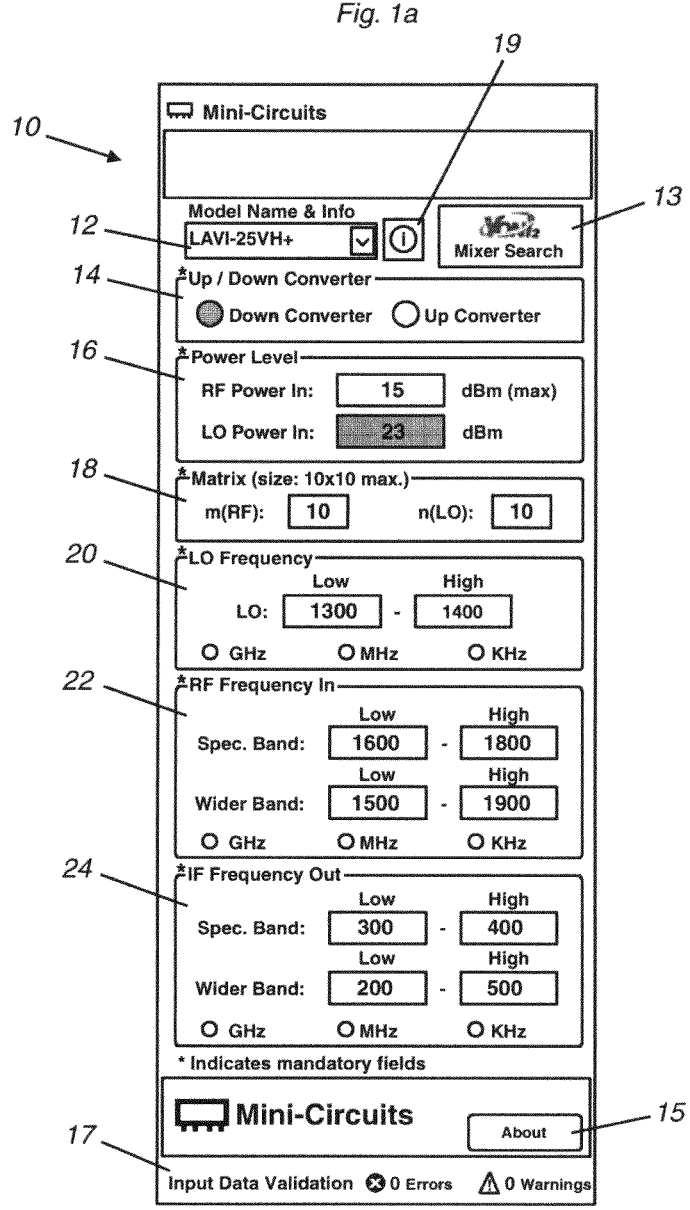
FIG. 1a is a representation of a Mixer Harmonics Calculator input screen.
Figure 1B:
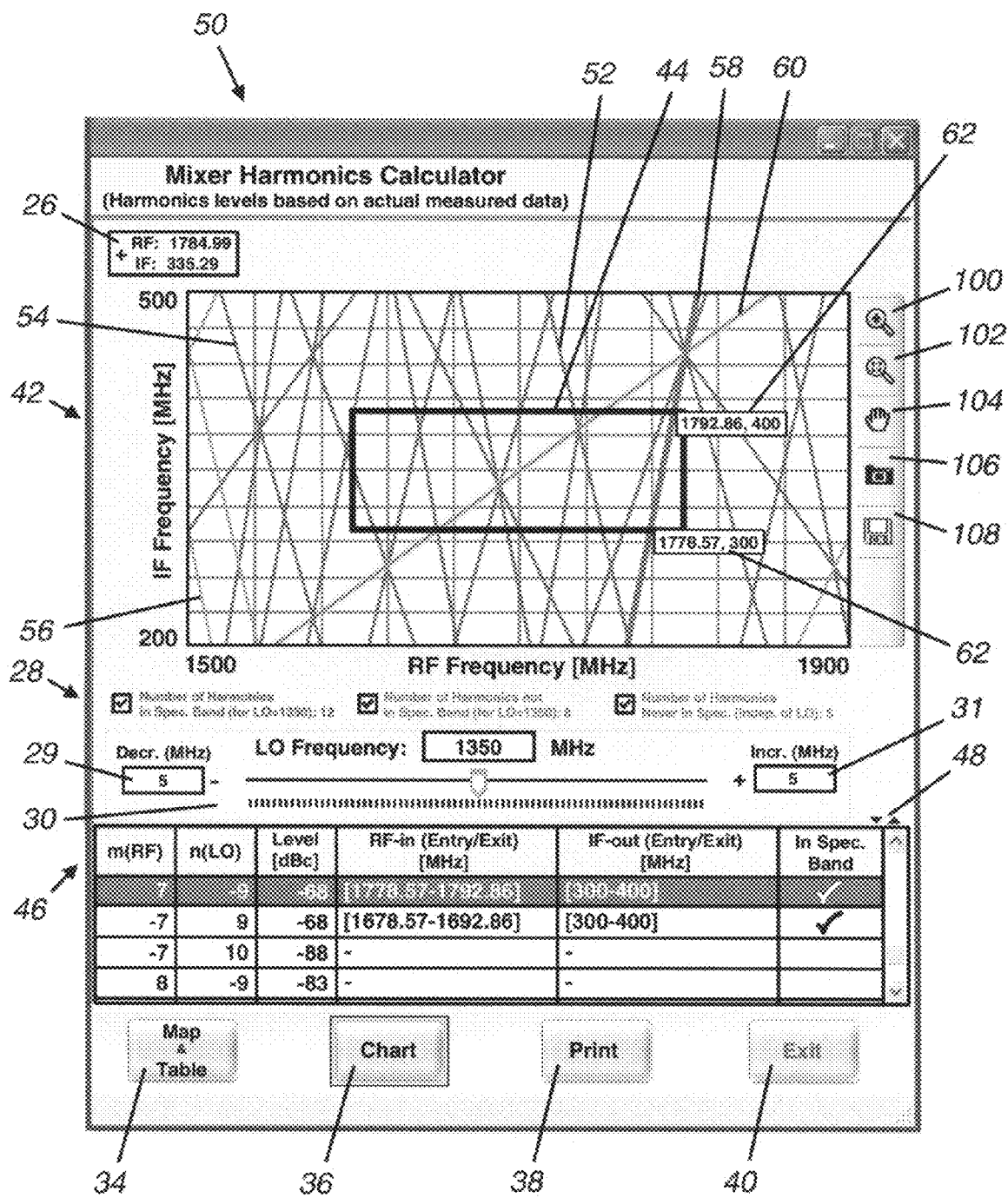
FIG. 1b is a representation of a Mixer Harmonics Calculator chart output screen.
Figure 1C:
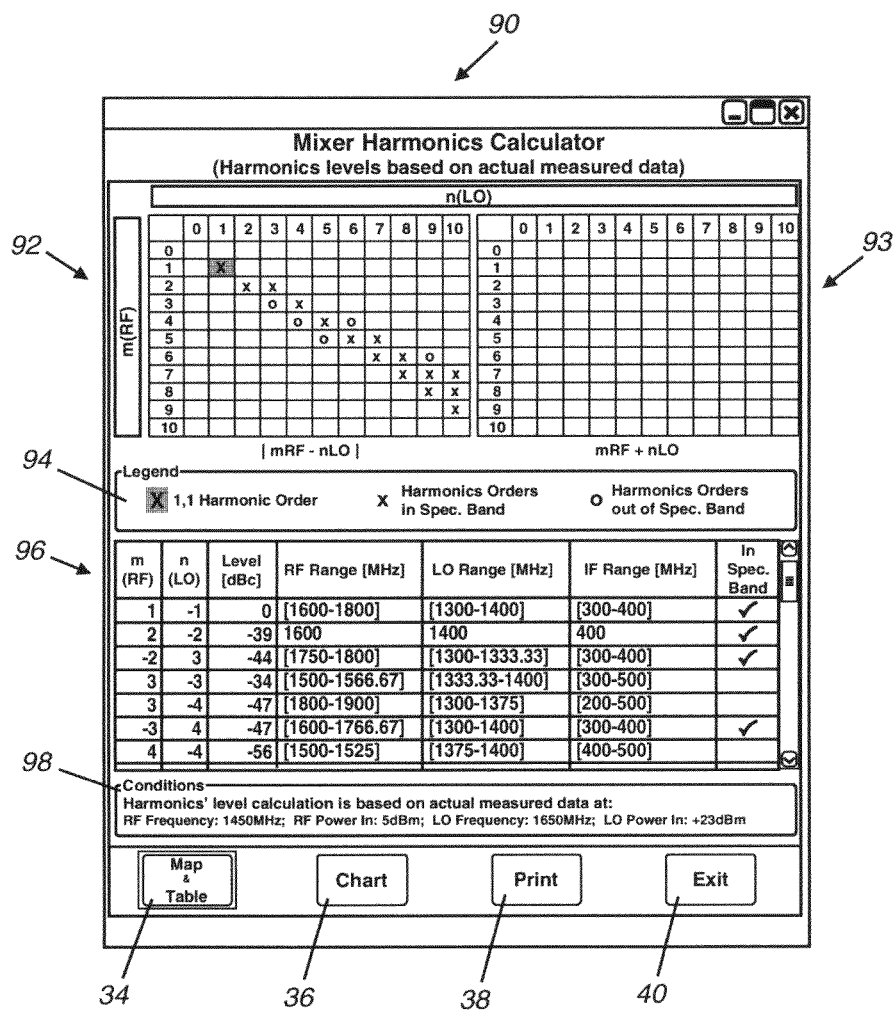
FIG. 1c is a representation of a Mixer Harmonics Calculator map and table output screen.

The invention described herein is a mixer harmonics calculator utilizing actual measured parametric data plus optionally interpolated and otherwise calculated data to accurately calculate harmonics frequency and amplitude response to user input ranges of LO and RF frequencies, up to at least $10^{th}$ order harmonics. The mixer harmonics calculator may optionally be incorporated into a database search system optimized for the matching of electronic components to a user's requirements. The preferred web-based realization of the database search system is called Yoni2 as a successor to the Yoni-1 catalog database search system. The harmonics data provided by the mixer harmonics calculator is displayed as a Harmonics Order table, chart or map showing the harmonics orders with their levels and their frequencies falling within the spec band and outside the spec band. The '√' in the right column as shown in FIG. 1B and FIG. 1C indicates the harmonics order is within the RF/IF spec.

The mixer circuits being measured include elements in addition to the basic mixer including the mixer baluns, internal matching networks and the high frequency parasitic effects caused by the actual packaging. Actual measured circuit data is used with the working assumption that for a typical wide band mixer, performance is generally flat within +/−5 dB when measured away from the frequency band edges. However, harmonic frequencies are present which are by-products of the circuit frequency mixing operation and which may be at least 10 times higher than the frequencies input to the mixer circuit. Harmonics at such high multiples of input frequencies are difficult to mathematically model accurately. In the present invention the output harmonics are measured at frequencies up to at least 10 times the input frequencies in order to supply the database with actual data rather than calculated approximations. Nth order harmonics can be present in high frequency circuits for one of two reasons. First, the input signal may already have a harmonic that's within the circuit's pass band. The second and more likely reason is the presence of a frequency outside of a receiver's pass band that gets into the receiver and then generates a harmonic product within the IF. This external signal thus has the effect of limiting receiver sensitivity.

With actual measured frequency data taken within the generally flat and broad frequency band, preferably measured near the center of the frequency band, additional points can now be calculated using the actual frequency response data as a reliable starting point. Interpolation between actual measured data points is reliable when the circuit response in the region between the data points is known to be linear. Likewise, extrapolation of circuit performance near the region of actual measured data is relatively linear as well. Circuit performance calculations for responses expected to be nonlinear may require more specialized calculations.

Amplitude data is measured at two power levels and for each harmonic the amplitude level is linear, allowing interpolation to be used as a accurate method for filling in the database and to respond to user queries. In the present invention the power levels where data is taken are +5 dBm and +15 dBm. More power levels could be used for measurement, but within the linear range and close to the linear range the interpolated and extrapolated data is seen as generally accurate within +/−5 dB. However, extrapolation of circuit performance to the edges of the usable range may result in errors of up to +/−20 dB.

The mixer harmonics calculator and preferred attendant database search system are designed to be used over a computer network such as the world wide web, where the database, the search engine, the query entry module, the output module, the calculator module and other software directly associated with the system is stored and maintained on one or more servers, and the users access the system from remote locations via standard browser software. The mixer harmonics calculator is designed to enable entering mixer model data manually or alternatively to retrieve mixer model data using a database search system such as the Yoni2. FIG. 1a shows an image of the mixer harmonics calculator screen 10 displayed to a user. This mixer harmonics calculator screen 10 serves as the query entry module. The query entry module can be used in two ways. A specific mixer model number can be entered at Model Name & Info 12 from a list of available choices. Alternatively, the Mixer Search button 13 can be used to access a mixer database search engine. A mixer selected by either method will have some parameters automatically entered into the query entry module. In addition, mixer data unrelated to a mixer in the database can be entered and harmonic calculations performed, but lacking any measured performance data in the database, the calculated results will be lacking any harmonics level information.

Figure 2:
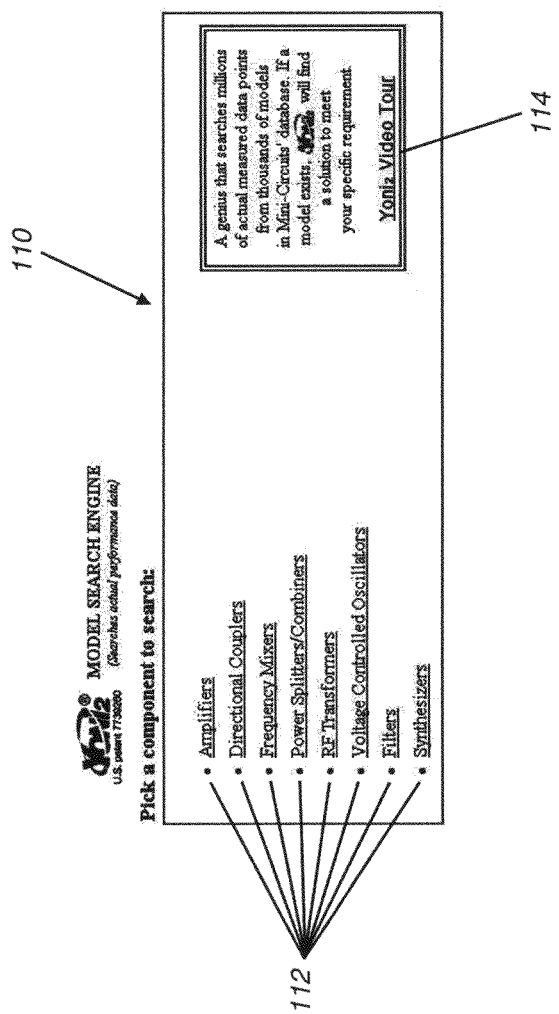
FIG. 2 is a representation of the entry screen of the Yoni2 search tool.

When the Mixer Search button 13 is clicked, the system displays a search request screen 120 as shown in FIG. 3. This screen is also reachable from within the general-purpose Yoni-2 search screen shown in FIG. 2, which shows an image of the Yoni2 entry screen 110 displayed to a user. In the current version of the Yoni2 system, there are component type selection buttons 112 for Amplifiers, Directional Couplers, Frequency Mixers, Power Splitters/Combiners, RF Transformers, Voltage Controlled Oscillators and Filters. There is also a button to access a video tour 114 of the search system. The search request screen 120 for Frequency Mixers has the physical parameter input Packaging Style 124, and parametric inputs for RF/LO Frequency 126, LO Power Level 128, Max. Conversion Loss 130, Min. LO-RF Isolation 132, Min. LO-IF Isolation 134, LO Frequency 136, Min. IP3 138, Max. RF port Voltage Standing Wave Ratio (VSWR) 140, Max. LO port VSWR 142, RF/LO Frequency 144, Max. IF port VSWR 146 and IF Frequency 148. The parameters Packaging Style 124, RF/LO Frequency 126 and Max. Conversion Loss 130 are required and on an actual screen are displayed as highlighted; other parameters are optional and are not highlighted on an actual screen. Fields such as Max. Conversion Loss 130 require parameter values to be entered, and fields such as RF/LO Frequency 126 require parameter value ranges to be entered.

Once the component parameter data is entered, either the Clear button 152 is clicked to clear the data and start over, or the Search button 150 is clicked and the system's search engine uses the entered parametric data and physical data to search the database for appropriate matches. If at least one perfect match for a set of component data to the specified parameters is not found, thus resulting in the search returning a null search condition, the priority entry module will prompt the user to assist in improving the match by providing a user-directed priority among a number of displayed parameters. The user's choice of mixer is automatically loaded into the mixer harmonics calculator input 10 to obtain more specific and detailed performance information on the chosen mixer. The data fields Model Name & Info 12 and Power Level 16 will be automatically populated from the database and a display called the dashboard (not shown) will also become visible, displaying detailed technical information about the chosen mixer. The model information button 19 can also be used to display more information about the selected mixer and to provide access to the dashboard.

The user then selects Up/Down Converter 14 as either up converter or down converter, Power Level 16 for RF Power In and LO Power In, Matrix 18 size for both RF and LO orders, LO Frequency 20 for Low and High limits as well as frequency band chosen from GHz, MHz and KHz, RF Frequency In 22 for both a Spec Band and a Wider Band as well as frequency band chosen from GHz, MHz and KHz, IF Frequency Out 24 for both a Spec Band and a Wider Band as well as frequency band chosen from GHz, MHz and KHz. The RF power value is taken from the chosen mixer's harmonics database table at a condition of RF high. The RF Power can be changed by the user within the limits of noise floor for the down limit and RF high for the up limit. The LO power value is the nominal LO power used for testing harmonics, and cannot be changed. The wider RF/IF Bandwidth must be greater or equal to the specified RF/IF bandwidth respectively. If there are any problems with the input data, error and warning counts will be displayed in the Input Data Validation bar 17 at the bottom of the input screen, and that can be clicked on to bring up detailed messages about the input problems. Additionally, the About button 15 can be clicked to display information about the software. The entries into the query entry module are processed by the search engine to supply parametric data specific to the chosen mixer and chosen parameter ranges to the calculator module, and data output from the calculator module is converted to the chosen display formats by the output module.

Figure 4B:
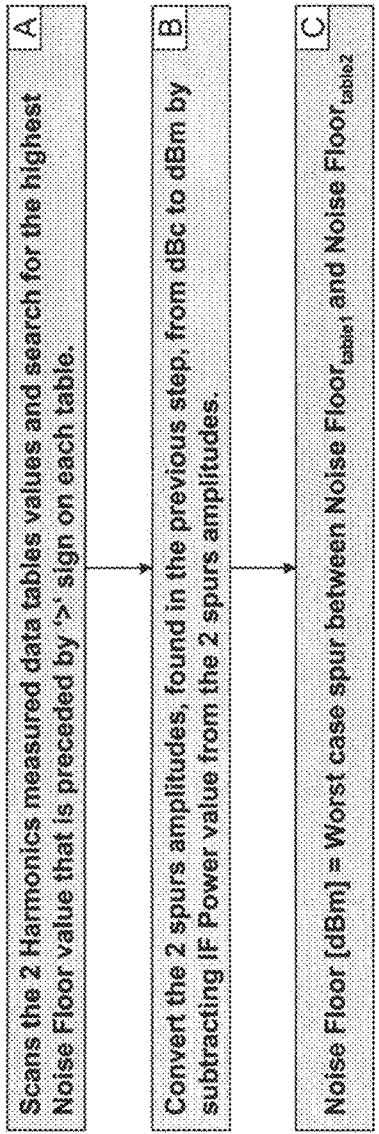
FIG. 4b is a flowchart showing the noise floor calculation rules for use in the mixer harmonics calculator program.

In the present invention, actual measured harmonics data is taken at RF power levels of +5 dBm and +15 dBm for each mixer in the database. Harmonics values for RF power levels other than the actual measured levels are interpolated or extrapolated, taking into account the noise floor defined for each mixer. FIG. 4*a* shows the steps taken per the spur amplitude calculation rules in the mixer harmonics calculator program, and FIG. 4*b* shows the flowchart of noise floor calculation rules used by the program.

The output display includes options for selecting a map and table display or a chart display. FIG. 1*b* shows the chart display 50 including a chart 42 and a table 46 of harmonics data. The table 46 displays harmonics order, harmonics amplitudes within IF, the exact Harmonic Order entry and exit frequencies of the desired RF & IF spec band and an indication whether the specified harmonic order is within the specification band. The chart 42 displays harmonics orders designated by red lines 52 for harmonics falling within the spec, blue lines 54 for harmonics falling outside the spec but with potential to fall within the spec depending on the LO frequency, and green lines 56 for harmonics that will never fall within the RF & IF spec for the user-specified LO frequency range. The spec boundaries are represented by the spec band window box 44 which is the heavy lined black rectangle within the chart 42. There are checkboxes 28 showing the quantities of Harmonics orders of red lines 52, blue lines 54 and green lines 56. The checkboxes 28 can be checked or unchecked and consequently the selected color of harmonic lines will be shown or hidden on the chart accordingly. As the cursor moves over the chart 42 a cursor display 26 will show the RF and IF frequencies for the cursor location. If a particular harmonic is selected the line will be displayed thicker 58 and the data for the selected harmonic will be highlighted in the table 46. The IF Harmonic Order |1RF−1LO| 60 is highlighted in yellow within the chart. Note that the colors chosen are arbitrary; other colors can be used or even dot and line patterns if color is not desired. Labels 62 bordering the spec band box 44 display the exact harmonic order entry and exit frequencies of the desired RF & IF spec band. The LO frequency may be shifted by a sliding control 30 and also by an increment button 31 and a decrement button 29 with user definable step ranges. The arrow buttons 48 allow the table 46 to be enlarged or shrunk. There is a zoom button 100, a zoom extents button 102, a pan button 104, a copy button 106 used to copy the chart 42 and LO frequency control settings to the clipboard for pasting into a document, a save button 108 for saving the chart 42 and LO frequency controls as a digital image file, a map and table display button 34, a chart display button 36, a print button 38 and an exit button 40.

When the zoom button 100 is used to see closer details of the harmonics, the pan button 104 can be used to move around within the extents of the full chart display. Each color group of harmonics can be shown or hidden individually. Changing the LO frequency with the sliding control 30 or the increment button 31 or decrement button 29 will cause harmonics to move in and out of the spec window, where moving in will cause the harmonic lines to display as red and moving out will cause the harmonic lines to display as blue. For the increment/decrement controls, the user clicks on the '+' or '−' signs to increase or decrease the LO frequency, and inputs numerical values to define the LO step values. This allows unwanted harmonics to be moved out of the spec window by altering the LO frequency.

FIG. 1*c* shows the map and table display 90 wherein there is a negative map 92 (|mRF−nLO|) and positive map 93 (|mRF+nLO|), each potentially containing several types of markers. The highlighted 'X' indicates IF Order |1RF−1LO|, |1RF+1LO|. The 'x' represents Harmonics Order (mRF−nLO, mRF+nLO) that fall within the IF Bandwidth spec. The 'o' represents Harmonics Order that falls within the wider band but out of the RF/IF Bandwidth spec. A legend 94 shows this information. Colors and other symbols can also be used to differentiate between different harmonics elements displayed. Also shown is a table 96 containing harmonics order, harmonics amplitudes & frequencies within IF, RF wider band and a check-mark indication of whether the specified harmonic order is within the specification band. When a specific harmonic is selected from the maps or the table, the corresponding harmonic display from the table or the maps will be highlighted. Additionally shown are the specific conditions 98 of the measured data taken from the harmonics table. At the bottom of the display there are buttons for switching between the map and table display option 34 and the chart display option 36, as well as a print button 38 and an exit button 40.

Another embodiment of the mixer harmonics calculator uses interpolation algorithms or other data-filling calculations to further populate the parametric data portions of the database.

While the present invention emphasizes the value of having a database populated with actual measured data for mixer performance calculations, the value extends to general system analysis in predicting system performance and limitations regarding unwanted signals within the pass band.

Having described herein illustrative embodiments and best mode of the present invention, persons of ordinary skill in the art will appreciate various other features and advantages of the invention apart from those specifically described above. It should therefore be understood that the foregoing is only illustrative of the principles of the invention, and that various modifications and additions can be made by those skilled in the art without departing from the spirit and scope of the invention. Accordingly, the appended claims shall not be limited by the particular features that have been shown and described, but shall be construed also to cover any obvious modifications and equivalents thereof.

What is claimed is:

1. A mixer harmonics calculator system comprising:
a database configured for organized storage in a memory and retrieval of parametric data for a plurality of electronic mixer components from a memory;
a search engine in communication with said database;
a query entry module configured to accept data input from a user in the form of parameter values and parameter value ranges for a plurality of parametric data;
the plurality of parametric data differing for each of the plurality of electronic mixer components and comprising actual measured parametric data;
said search engine accepting a query from said query entry module and performing a search within said database;
a calculator module performing harmonics calculations with parametric data found by said search engine; and,
an output module in communication with said calculator module, said output module configured to provide display of the results of said harmonics calculations.

2. The mixer harmonics calculator system as described in claim 1 wherein said data input includes part numbers for a plurality of electronic mixer components.

3. The mixer harmonics calculator system as described in claim 1 wherein said parametric data includes measurements of internal balun performance, matching networks performance and electronic package performance effects for each of the plurality of electronic mixer components.

4. The mixer harmonics calculator system as described in claim 1 wherein said parametric data is measured for each of the plurality of electronic mixer components at a center frequency and two power levels.

5. The mixer harmonics calculator system as described in claim 1 wherein said query entry module and said calculator module provide means for selecting and calculating multiple orders of sum/difference mixing products.

6. The mixer harmonics calculator system as described in claim 5 wherein said multiple orders of sum/difference mixing products include up to a 10×10 matrix of mixing products.

7. The mixer harmonics calculator system as described in claim 1 wherein the data input from a user includes data selected from the group consisting of mixer model name, up/down converters, radio frequency (RF) power level, local oscillator (LO) power level, matrix size for orders of mixing products, LO frequency low limit, LO frequency high limit, RF frequency input spec band low limit, RF frequency input spec band high limit, RF frequency input wider band low limit, RF frequency input wider band high limit, intermediate frequency (IF) frequency output spec band low limit, IF frequency output spec band high limit, IF frequency output wider band low limit and IF frequency output wider band high limit.

8. The mixer harmonics calculator system as described in claim 1 wherein said output module provides means for altering the local oscillator (LO) frequency, thereby said calculator module recalculates harmonic frequencies, and said output module displays the new harmonic frequency response, whereby a user can view whether at least a portion of the harmonic frequencies have moved in or out of a particular specified band of frequencies.

9. A mixer harmonics calculator system comprising:
a database configured for organized storage in a memory and retrieval of parametric data for a plurality of electronic mixer components from a memory;
a search engine in communication with said database;
a query entry module configured to accept data input from a user in the form of parameter values and parameter value ranges for a plurality of parametric data;
the plurality of parametric data differing for each of the plurality of electronic mixer components, said parametric data comprises in part actual harmonics data;
said search engine accepting a query from said query entry module and performing a search within said database;
a calculator module performing harmonics calculations with parametric data found by said search engine and calculating resultant harmonics output from said actual harmonics data; and,
an output module in communication with said calculator module, said output module configured to provide display of the results of said harmonics data, said display being of actual and calculated harmonics data.

10. The mixer harmonics calculator system as described in claim 9 wherein said output module provides utilities selected from the group consisting of zoom in, zoom extents, pan, copy to clipboard and save as image.

11. The mixer harmonics calculator system as described in claim 9 wherein said query entry module is additionally configured to accept data input from a user in the form of a catalog part number.

12. The mixer harmonics calculator system as described in claim 9 wherein said system is accessed through an electronic component database search system including components other than mixers.

13. The mixer harmonics calculator system as described in claim 12 wherein the result of a search within said electronic component database search system allows the option of accessing said mixer harmonic calculator system.

14. The mixer harmonics calculator system as described in claim 9 wherein said system includes validation of the input data; and,
said validation includes error indication and warning of improper data.

15. The mixer harmonics calculator system as described in claim 9 wherein additional parametric data is calculated in response to at least one of the parametric value ranges of a query entry.

16. The mixer harmonics calculator system as described in claim 9 wherein the parametric data is actual measured parametric data and calculated parametric data.

17. The mixer harmonics calculator system as described in claim 9 wherein the parametric data is a combination of required data input and optional data input.

18. The mixer harmonics calculator system as described in claim 9 wherein said display of the results of said harmonics calculations includes results in chart format selected from the group consisting of all harmonics for the specified range of radio frequency (RF) and local oscillator (LO) inputs, all harmonics within the spec band, all harmonics outside the spec band, all harmonics that will never fall within the spec band, the spec band window displayed as an outlined box within the chart, data associated with selected harmonics highlighted in an included table of harmonics data, the intermediate frequency (IF) Harmonic Order of a selected harmonic, the exact Harmonic Order entry and exit frequencies of the specified RF and IF spec band, and the RF and IF frequencies displayed for the location of the cursor.

19. The mixer harmonics calculator system as described in claim 9 wherein said display of the results of said harmonics calculations includes results in table format selected from the group consisting of harmonics order, harmonics amplitudes and frequencies within intermediate frequency (IF), and indication of whether a selected harmonic order is within the specification band.

20. The mixer harmonics calculator system as described in claim 9 wherein said output module provides means for specifically visually indicating a selected graphed harmonic line and a matching table entry, and specifically visually indicating the first order harmonic.

21. The mixer harmonics calculator system as described in claim 9 wherein said display of the results of said harmonics calculations includes results in both map and table format and wherein when a specific harmonic is selected from said map or said table, the corresponding harmonic display from said table or said map will be highlighted.

22. A mixer harmonics calculator system comprising:
a database configured for organized storage in a memory and retrieval of parametric data for a plurality of electronic mixer components from a memory;
said parametric data including measurements of internal balun performance, matching networks performance and electronic package performance effects for each of the plurality of electronic mixer components;
said parametric data being measured for each of the plurality of electronic mixer components at a center frequency and two power levels;
a search engine in communication with said database;
a query entry module configured to accept data input from a user in the form of parameter values and parameter value ranges for a plurality of parametric data;
the data input from a user including data selected from the group consisting of mixer model name, up/down converters, radio frequency (RF) power level, local oscillator (LO) power level, matrix size for orders of mixing products, LO frequency low limit, LO frequency high limit, RF frequency input spec band low limit, RF frequency input spec band high limit, RF frequency input wider band low limit, RF frequency input wider band high limit, intermediate frequency (IF) frequency output spec band low limit, IF frequency output spec band high limit, IF frequency output wider band low limit and IF frequency output wider band high limit; the plurality of parametric data differing for each of the plurality of electronic mixer components and comprising actual measured parametric data;
said search engine accepting a query from said query entry module and performing a search within said database;
a calculator module performing harmonics calculations with parametric data found by said search engine;
said query entry module and said calculator module cooperatively providing means for selecting and calculating multiple orders of sum/difference mixing products up to a 10×10 matrix of mixing products;
an output module in communication with said calculator module, said output module configured to provide display of the results of said harmonics calculations in formats selected from the group consisting of chart, map, or table;
said chart output format including displayed data selected from the group consisting of all harmonics for the specified range of RF and LO inputs, all harmonics within the spec band, all harmonics outside the spec band, all harmonics that will never fall within the spec band, the spec band window displayed as an outlined box within the chart, data associated with selected harmonics highlighted in an included table of harmonics data, the IF Harmonic Order of a selected harmonic, the exact Harmonic Order entry and exit frequencies of the specified RF and IF spec band, and the RE and IF frequencies displayed for the location of the cursor;
said map output format including displayed data selected from the group consisting of a negative map showing |mRF−nLO|, a positive map showing |mRF+nLO|, a marker for IF Order |1RF−1LO|, |1RF+1LO|, Harmonics Order (mRF−nLO, mRF+nLO) that fall within the IF Bandwidth spec, and Harmonics Order that fall within the wider band but out of the RF/IF Bandwidth spec, where m is the order of RF harmonics and n is the order of LO harmonics;
said table output format including displayed data selected from the group consisting of harmonics order, harmonics amplitudes and frequencies within IF, and indication of whether a selected harmonic order is within the specification band;
said output module further providing means for altering the LO frequency, thereby causing said calculator module to recalculate harmonic frequencies, thereby causing said output module to display the new harmonic frequency response, whereby a user can view whether at least a portion of the harmonic frequencies have moved in or out of a particular specified band of frequencies; and,
said output module further providing means for specifically visually indicating a selected graphed harmonic line and a matching table entry, and specifically visually indicating the first order harmonic.

23. A method of evaluating the harmonics of an electronic mixer, comprising the steps of:
(1) entering parameter values and parameter value ranges for an electronic mixer component into a query entry module;
(2) retrieving actual measured parametric data for the electronic mixer component through the action of a search engine upon a database;
(3) performing harmonics calculations with a calculator module upon said actual measured parametric data; and,
(4) displaying results of said harmonics calculations with an output module.

24. A method of evaluating the harmonics of an electronic mixer, comprising the steps of:
(1) entering parameter values and parameter value ranges into a component search screen for parameters that are required data;
(2) optionally entering parameter values and parameter value ranges into said search screen for parameters that are optional data;
(3) retrieving a list of electronic mixer components through an action of a search engine;
(4) selecting a specific electronic mixer component from the list returned by said search engine;
(5) selecting the function of an electronic mixer harmonics calculator;
(6) entering parameter values and parameter value ranges for the selected electronic mixer component into a query entry screen;
(7) retrieving actual measured parametric data for the electronic mixer component through another action of said search engine;
(8) performing harmonics calculations with the calculator function using said actual measured parametric data; and,
(9) displaying results of said harmonics calculations with an output module

* * * * *